(12) United States Patent
Lee

(10) Patent No.: US 12,173,539 B2
(45) Date of Patent: Dec. 24, 2024

(54) DOOR HINGE DEVICE FOR VEHICLES

(71) Applicants: HYUNDAI MOTOR COMPANY, Seoul (KR); Kia Corporation, Seoul (KR)

(72) Inventor: Jaeseung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 444 days.

(21) Appl. No.: 17/586,300

(22) Filed: Jan. 27, 2022

(65) Prior Publication Data

US 2022/0412142 A1 Dec. 29, 2022

(30) Foreign Application Priority Data

Jun. 28, 2021 (KR) ........................ 10-2021-0084065

(51) Int. Cl.
| | |
|---|---|
| *E05D 15/58* | (2006.01) |
| *B60J 5/04* | (2006.01) |
| *E05D 3/18* | (2006.01) |
| *E05D 15/04* | (2006.01) |
| *E05D 15/30* | (2006.01) |

(52) U.S. Cl.
CPC ............ *E05D 15/58* (2013.01); *B60J 5/0479* (2013.01); *E05D 3/18* (2013.01); *E05D 15/04* (2013.01); *E05D 15/30* (2013.01); *E05D 2015/586* (2013.01); *E05Y 2201/426* (2013.01); *E05Y 2900/531* (2013.01)

(58) Field of Classification Search
CPC ........... E05D 15/58; E05D 3/18; E05D 15/04; E05D 15/30; E05D 2015/586; B60J 5/0479; E05Y 2201/426; E05Y 2900/531; E05Y 2201/708; E05Y 2201/71; E05F 15/614; E05F 15/632; E05F 15/655; E05F 15/603; F16H 19/04
See application file for complete search history.

(56) References Cited

U.S. PATENT DOCUMENTS

| | | | | |
|---|---|---|---|---|
| 2010/0127530 | A1* | 5/2010 | Elliott ................ | E05D 15/1081 296/146.11 |
| 2012/0049577 | A1* | 3/2012 | Thomas ................ | B60J 5/0479 296/202 |
| 2020/0032569 | A1* | 1/2020 | Taylor .................... | E05F 15/63 |
| 2021/0172236 | A1* | 6/2021 | Choi ...................... | E05D 15/48 |
| 2021/0214976 | A1* | 7/2021 | Hiramoto .............. | E05B 77/265 |
| 2021/0214977 | A1* | 7/2021 | Kimura .................. | E05B 81/14 |
| 2021/0363809 | A1* | 11/2021 | Kim ..................... | E05F 15/662 |

FOREIGN PATENT DOCUMENTS

KR 10-2019-0028966 A 3/2019

* cited by examiner

*Primary Examiner* — Paul N Dickson
*Assistant Examiner* — Sara Laghlam
(74) *Attorney, Agent, or Firm* — MORGAN, LEWIS & BOCKIUS LLP

(57) ABSTRACT

A door hinge apparatus of a vehicle may include a slide unit including a slide body and a main slider where the slide body is provided on one side of a vehicle body corresponding to an end portion of a door in the vehicle and the main slider is movable in a width direction of the vehicle with respect to the slide body, and a door hinge bracket engaged with the end portion of the door and operably coupled to the main slider.

17 Claims, 14 Drawing Sheets

DOOR HINGE DEVICE FOR VEHICLES

CROSS-REFERENCE TO RELATED APPLICATION

The present application claims priority to Korean Patent Application No. 10-2021-0084065 filed on Jun. 28, 2021, the entire contents of which is incorporated herein for all purposes by this reference.

BACKGROUND OF THE INVENTION

Field of the Invention

The present invention relates to a door hinge apparatus of a vehicle. More particularly, the present invention relates to a door hinge apparatus of a vehicle without a B-pillar that enables opening and closing operation of a rear door independently from a front door, by displacing the rear door rearward for the opening and closing operation to secure a rotation trajectory of the rear door to avoid interference with the front door.

Description of Related Art

In general, a vehicle door is a door that separates the inside and outside of the vehicle. The vehicle door blocks external noise, rain, dust, wind, etc., and in case of a side surface collision, provides an important function of protecting the occupants by absorbing the impact together with the side structure to safely protect an occupant.

There are various types of vehicle doors, including special-purpose doors, but hinge-type swing doors are most commonly applied to passenger vehicles.

In general, a swing door refers to a door that opens toward the outside of the vehicle body around a hinge shaft provided between the door and the vehicle body through a hinge bracket, and has advantages of easy opening and closing and simple structure providing easy maintenance and repair.

On the other hand, some vehicles are applied with opposite swing doors, which have a large open feeling when the door is opened and is advantageous for occupants to get on or off the vehicle.

These opposite swing doors include a type without a B-pillar and a type with a B-pillar.

FIG. 1 is a side view of a vehicle applied with opposite swing doors according to an example of the related art, and FIG. 2 is a cross-sectional view exemplarily illustrating a portion in which a front door and a rear door meet each other in the vehicle of FIG. 1.

First, referring to FIG. 1 and FIG. 2, an example of opposite swing doors applied to a vehicle 100 without a B-pillar is illustrated. A front door 110 has a hinge shaft provided at the front end portion of the front door 110, and a rear door 120 has a hinge shaft provided at the rear end portion of the rear door 120.

A latch L for maintaining the locked state is provided on one side of the front door 110 or the rear door 120 in the opposite swing doors.

Furthermore, a sealing S for airtightness is provided between the rear end portion of the front door 110 and the front end portion of the rear door 120.

As described above, although the opposite swing doors of the vehicle 100 As described above, the opposite swing doors of the vehicle 100 without a B-pillar has good open feeling when the passengers get on/off or in leisure activities. However, there is a drawback that an opening/closing sequence may be preset such that the front door 110 must first be opened before or closed after opening or closing the rear door 120, due to overlapping interference of rotation trajectories of the front door 110 and the rear door 120 when opening and closing the front door 110 and the rear door 120.

Accordingly, since the opening/closing sequence of the front door 110 and the rear door 120 is preset, there is a problem in that the rear door 120 cannot be opened or closed alone.

FIG. 3 is a side view of a vehicle applied with opposite swing doors according to another example of the related art, and FIG. 4 is a cross-sectional view exemplarily illustrating a portion in which a front door and a rear door meet each other in the vehicle of FIG. 3.

Referring to FIG. 3 and FIG. 4, an example of opposite swing doors applied to a vehicle 200 with a B-pillar 230 is illustrated. In the instant case also, a front door 210 has a hinge shaft provided at the front end portion of the front door 2110, and a rear door 220 has a hinge shaft provided at the rear end portion of the rear door 220.

In the present opposite swing doors, a latch L for maintaining a locked state is provided between the B pillar 230 and each side of the front door 210 and the rear door 220.

Furthermore, a sealing S for airtightness is provided between the B-pillar 230 and the rear end portion of the front door 210 and the front end portion of the rear door 220 corresponding to the B-pillar 230.

Accordingly, in the opposite swing doors of the vehicle 200 with a B-pillar, it is advantageous that the front door 210 and the rear door 220 are configured to be independently opened and closed, and thus the operation sequence is not limited. However, the open feeling deteriorates when the passengers get on/off or in leisure activities, due to the application of the B-pillar 230.

Accordingly, depending on the presence or absence of the B-pillar, the opposite swing doors have a difference in open feeling, and a difference in opening and closing operations of the front door and the rear door.

Meanwhile, as described above, to solve the problem of the limited operation sequence of the front door 110 and the rear door 120 while maintaining the open feeling of the vehicle 100 without the B-pillar, there is an example of the related art that employs a gooseneck-type hinge device as a door hinge apparatus of the opposite swing doors. However, such a gooseneck-type hinge device requires a lot of free space in the vehicle body width direction due to the characteristic of its shape such that it is difficult to efficiently configure the vehicle body layout.

Accordingly, to apply the opposite swing doors to a vehicle without a B-pillar, a door hinge apparatus configured for implementing a new opening/closing structure is advantageous.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door hinge apparatus of a vehicle without a B-pillar that enables opening and closing operation of a rear door independently from a front door by displacing the rear door rearward for the opening and closing operation to secure a rotation trajectory of the rear door to avoid interference with the front door front door.

A door hinge apparatus of a vehicle according to various exemplary embodiments of the present invention includes a slide unit including a slide body and a main slider where the slide body is provided on one side of a vehicle body corresponding to an end portion of a door in the vehicle and the main slider is movable in a width direction of the vehicle with respect to the slide body, and a door hinge bracket engaged with the end portion of the door and operably coupled to the main slider.

A door hinge apparatus of a vehicle according to various exemplary embodiments of the present invention may further include a 2-stage hinge slider configured to be movable in the width direction of the vehicle and also toward a vehicle rear side simultaneously according to a preset radius by corresponding bridges rotatable in an upper slide groove and a lower slide groove formed in the main slider. The door hinge bracket may be connected to the 2-stage hinge slider through a hinge shaft.

A door hinge apparatus of a vehicle according to various exemplary embodiments of the present invention may further include a driving unit configured to provide a driving torque to the main slider and the bridges so that, after the main slider moves in the width direction of the vehicle with respect to the slide body, the 2-stage hinge slider in a preset range moves with respect to the main slider in the width direction of the vehicle and also toward the vehicle rear side according to the preset radius.

The slide body may include a rear plate, an upper plate, and a lower plate, where internal surfaces of the upper plate and the lower plate facing each other are formed as rail surfaces that are slanted, and a first gear slot and a second gear slot are formed in a lower portion of the rear plate. The main slider may include a center rail, an upper rail, and a lower rail that are formed on a rear surface of the main slider to protrude toward a vehicle front side, is provided movable in the width direction of the vehicle along the rail surfaces of the slide body, forms the upper slide groove between the center rail and the upper rail and the lower slide groove between the center rail and the lower rail, and includes a rack portion and a gear hole in a lower portion of the rear surface corresponding to the first and second gear slots.

The end portion of the door may be a rear end portion of a rear door in the vehicle.

The slide body may be provided on a side external panel corresponding to the rear end portion of the rear door so that the rail surfaces are disposed from a vehicle front internal side of the vehicle body toward a vehicle rear external side thereof.

The first gear slot may be formed below the second gear slot.

The center rail may be centrally formed on the rear surface to protrude toward the vehicle front side thereof. The upper rail may be formed above the center rail on the rear surface to protrude toward the vehicle front side, may include an upper surface formed as a slide surface contacting a rail surface of the upper plate of the slide body among the rail surfaces, and forms the upper slide groove between the upper rail and the center rail. The lower rail may be formed below the center rail on the rear surface to protrude toward the vehicle front side, may include a lower surface formed as a slide surface contacting a rail surface of the lower plate of the slide body among the rail surfaces, and includes the lower slide groove between the lower rail and the center rail.

In the main slider, an upper guide groove may be formed on a lower surface of the upper rail and an upper surface of the center rail, respectively, according to a radius of an upper bridge. A lower guide groove may be formed on an upper surface of the lower rail and a lower surface of the center rail, respectively, according to a radius of a lower bridge.

The 2-stage hinge slider may include upper and lower hinge sliders provided in the upper slide groove and the lower slide groove of the main slider through an upper bridge and a lower bridge rotatable around corresponding bridge shafts, respectively so that upper and lower hinge sliders are movable in the width direction of the vehicle and also toward the vehicle rear side simultaneously according to the preset radius.

In the 2-stage hinge slider, the upper hinge slider may be movably disposed in the upper slide groove. The upper bridge may be provided in the upper slide groove to be rotatable around an upper bridge shaft, and connected to the upper hinge slider through an upper rotation guide bar. The lower hinge slider may be movably disposed in the lower slide groove. The lower bridge may be provided in the lower slide groove to be rotatable around a lower bridge shaft, and connected to the lower hinge slider through a lower rotation guide bar.

The upper bridge may be formed toward a vehicle external side of the vehicle body compared to the lower bridge.

The upper rotation guide bar may move in the upper slide groove while having end portions inserted in the upper guide groove. The lower rotation guide bar may move in the lower slide groove while having end portions inserted in the lower guide groove.

The door hinge bracket may be engaged with the end portion of the door, and is connected to a vehicle external side end portion of the 2-stage hinge slider through the hinge shaft.

The driving unit may be configured such that, while a plurality of gears are operated by a driving torque, after the main slider is moved in the width direction of the vehicle along a rail surface of the slide body, the 2-stage hinge slider in the upper slide groove and the lower slide groove of the main slider is moved, in the preset range, in the width direction of the vehicle and also toward the vehicle rear side, according to the preset radius.

The driving unit may include, a motor is mounted on a motor bracket formed on the slide body to provide the driving torque, a first motor gear provided on a motor shaft of the motor and continuously engaged with the rack portion of the main slider through the first gear slot, a second motor gear provided on the motor shaft of the motor and disposed corresponding to the second gear slot, a bridge drive gear mounted on a gear bracket formed on the rear plate of the slide body and continuously engaged with the second motor gear, and a bridge gear fitted with the lower bridge and engageable with the bridge drive gear in the preset range through the gear hole and the second gear slot.

The second motor gear and the bridge drive gear may have a gear ratio to transfer the driving torque of the motor to the bridge gear by deceleration.

The second gear slot may be formed across the rear plate of the slide body in the width direction of the vehicle so that the bridge gear is engaged with the bridge drive gear after moving to the bridge drive gear.

According to various exemplary embodiments of the present invention, in a process of opening of the rear door, the rear end portion of the rear door is pushed toward the vehicle rear external side in advance, to secure the rotation trajectory of the rear door without interference with other component portions, and in the instant state, the opening and closing operation of the rear door alone is enabled.

Therefore, according to various exemplary embodiments of the present invention, in opposite swing doors of a vehicle without a B-pillar, while maintaining the merit of good open feeling when the passengers get on/off or in leisure activities, the door opening and closing sequence is not limited.

Furthermore, a door hinge apparatus of a vehicle according to an exemplary embodiment of the present invention is slimmer than a conventional gooseneck-type hinge device, and also has an advantage in vehicle body layout configuration because it does not require an extra free space for rear door operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
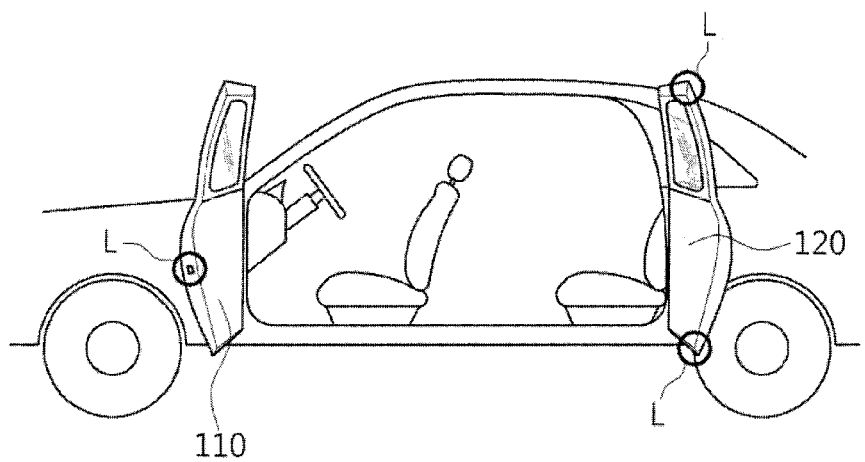
FIG. 1 is a side view of a vehicle applied with opposite swing doors according to an example of the related art.
Figure 2:
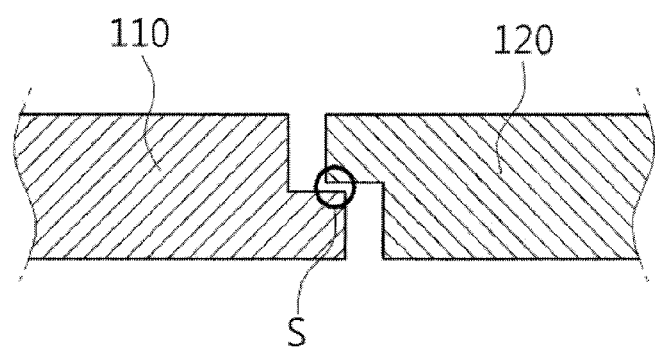
FIG. 2 is a cross-sectional view exemplarily illustrating a portion in which a front door and a rear door meet each other in the vehicle of FIG. 1.
Figure 3:
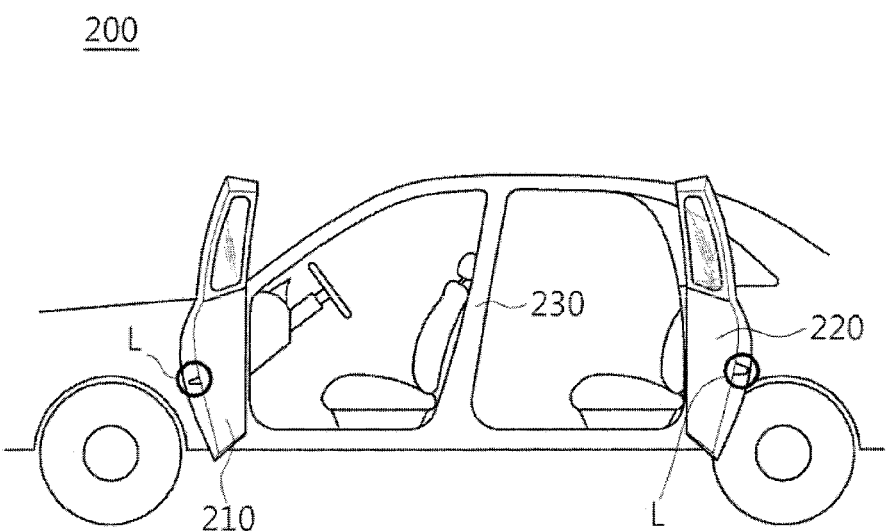
FIG. 3 is a side view of a vehicle applied with opposite swing doors according to another example of the related art.
Figure 4:
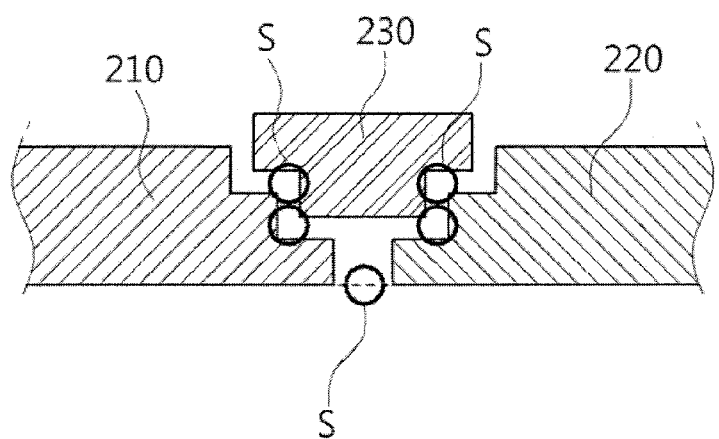
FIG. 4 is a cross-sectional view exemplarily illustrating a portion in which a front door and a rear door meet each other in the vehicle of FIG. 3.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment will be described in detail with reference to the accompanying drawings.

The size and thickness of each element are arbitrarily shown in the drawings, but the present invention is not necessarily limited thereto, and in the drawings, the thickness of layers, films, panels, regions, etc., are exaggerated for clarity. Furthermore, the drawings and description are to be regarded as illustrative in nature and not restrictive.

Figure 5:
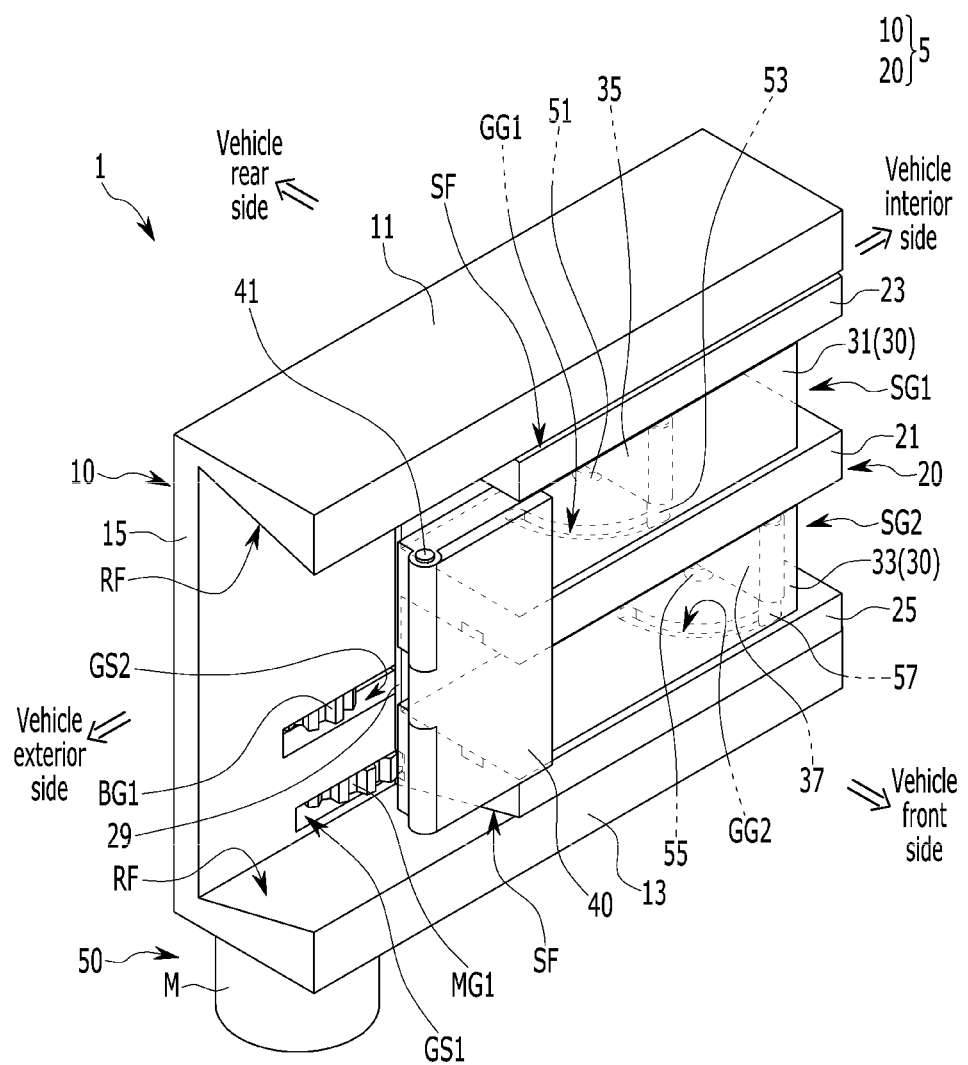
FIG. 5 is a perspective view of a door hinge apparatus of a vehicle according to an exemplary embodiment of the present invention.

In describing various exemplary embodiments of the present invention, for convenience of the description, a lower left direction in FIG. 5 is referred to as a vehicle external side, an upper right direction in FIG. 5 is referred to as a vehicle interior side, an upper left direction in FIG. 5 is referred to as a vehicle rear side, and a lower right direction in FIG. 5 is referred to as a vehicle front side. Furthermore, a door hinge apparatus of a vehicle according to various exemplary embodiments of the present invention may be provided at both rear doors of driver and passenger sides. For description, the following takes an example of a door hinge apparatus applied to the rear door of the passenger side.

Figure 6:
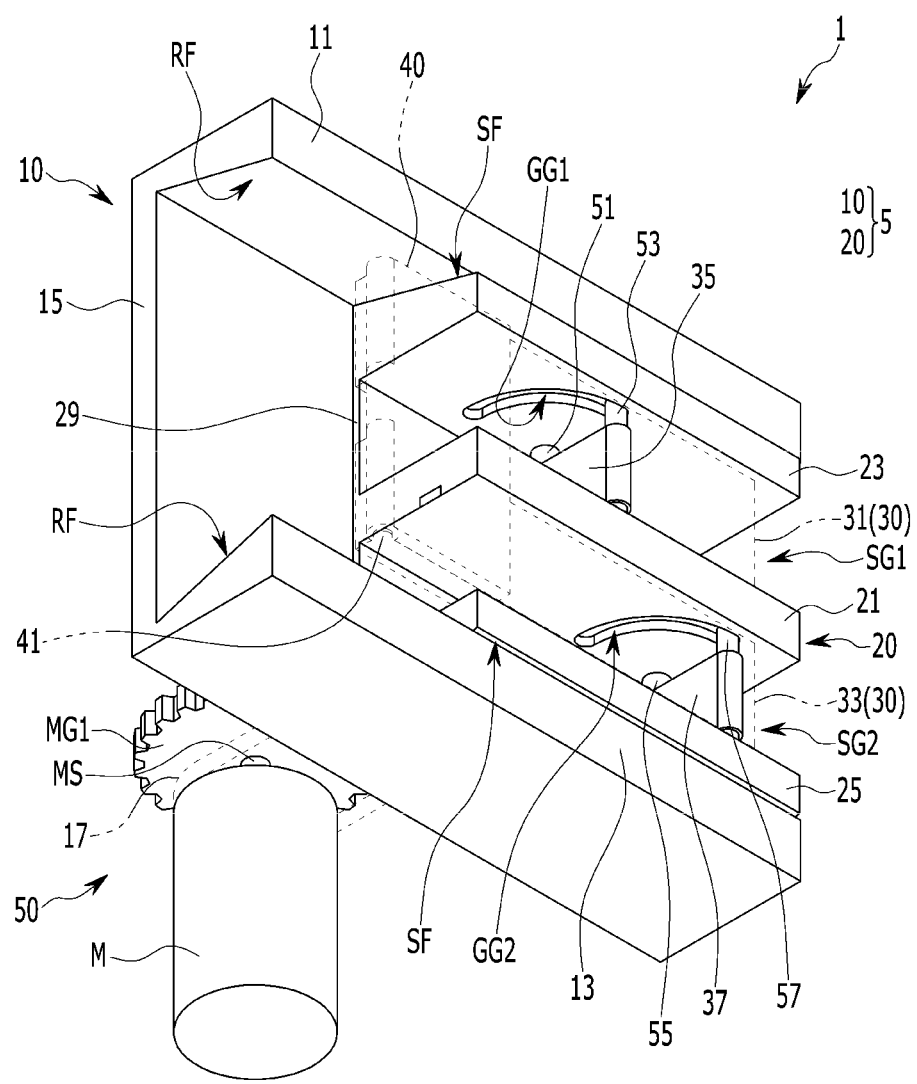
FIG. 6 is another perspective view of a door hinge apparatus of a vehicle according to an exemplary embodiment of the present invention.
Figure 7:
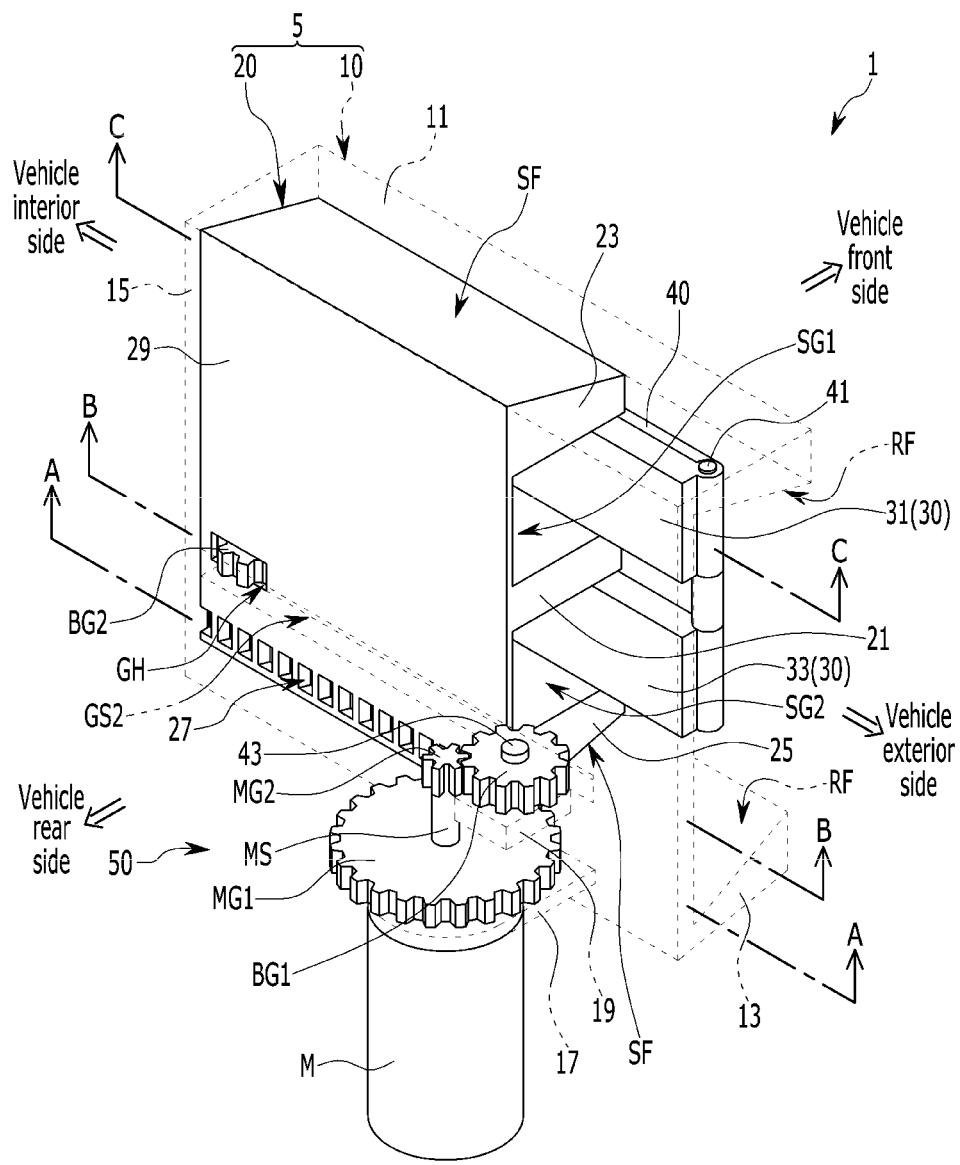
FIG. 7 is another perspective view of a door hinge apparatus of a vehicle according to an exemplary embodiment of the present invention.

FIG. 5 is a perspective view of a door hinge apparatus of a vehicle according to various exemplary embodiments of the present invention, FIG. 6 is another perspective view of a door hinge apparatus of a vehicle according to various exemplary embodiments of the present invention, and FIG. 7 is another perspective view of a door hinge apparatus of a vehicle according to an exemplary embodiment of the present invention.

Figure 8:
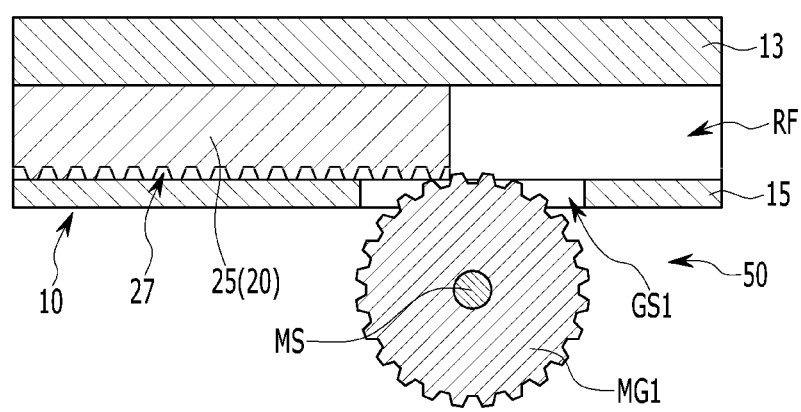
FIG. 8 is a cross-sectional view taken along line A-A of FIG. 7.
Figure 9:
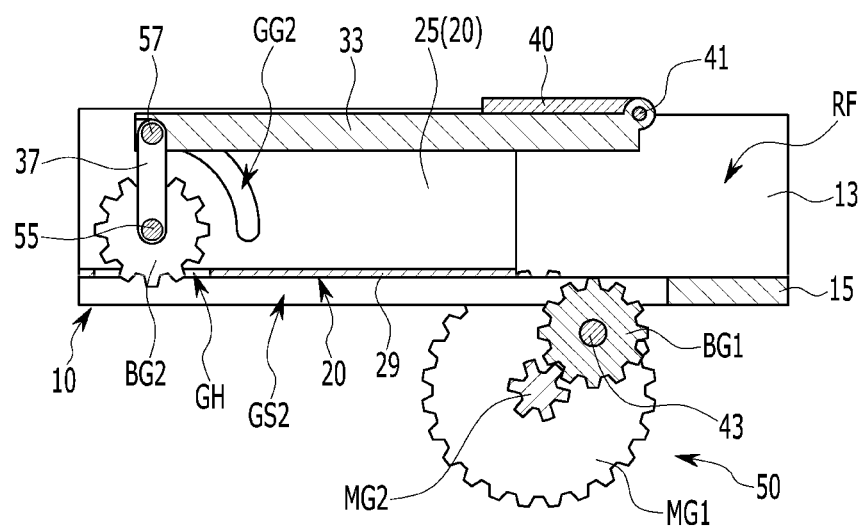
FIG. 9 is a cross-sectional view taken along line B-B of FIG. 7.
Figure 10:
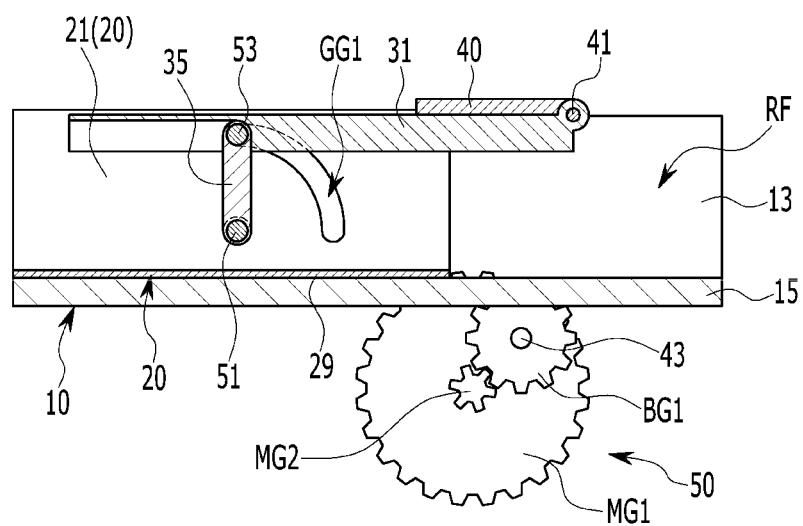
FIG. 10 is a cross-sectional view taken along line C-C of FIG. 7.
Figure 11:
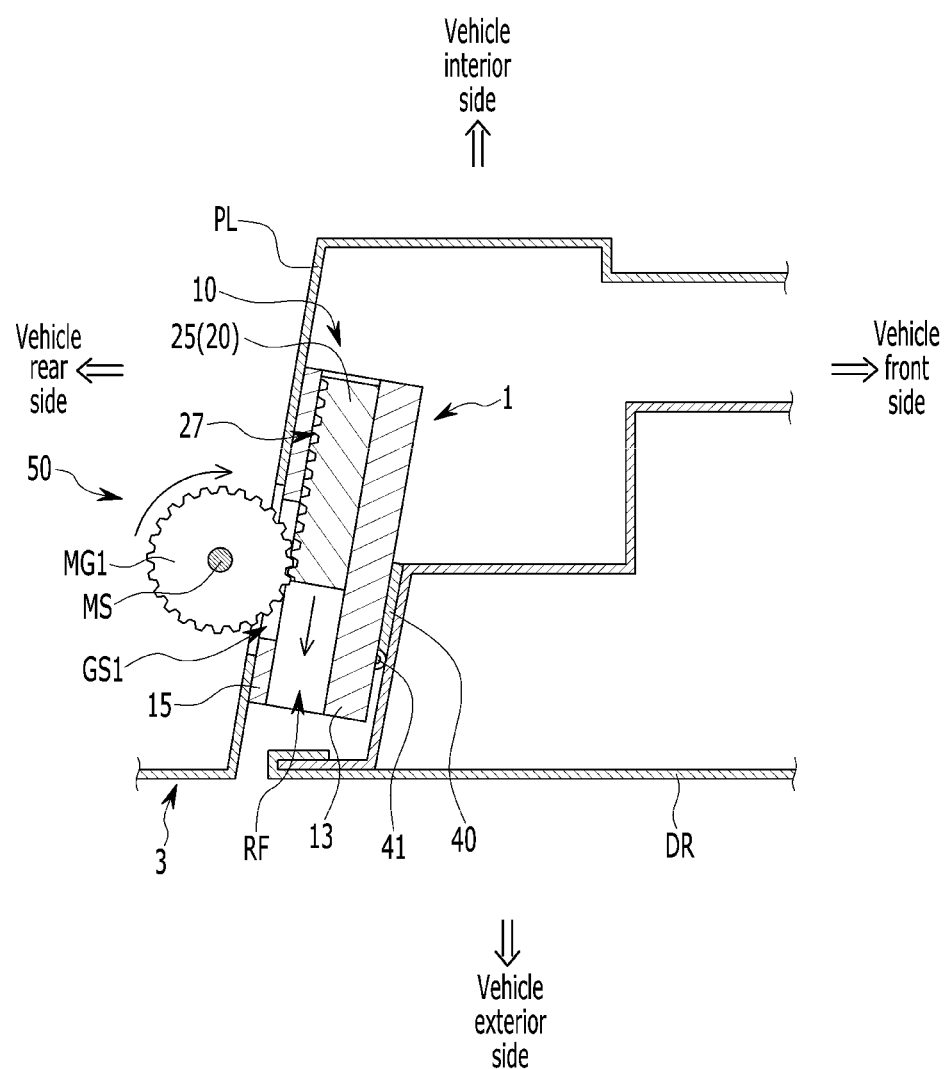
FIG. 11 is a cross-sectional view taken along line A-A of FIG. 7 of a door hinge apparatus of a vehicle according to various exemplary embodiments of the present invention, before operation.

Furthermore, FIG. 8, FIG. 9, and FIG. 10 are respectively a cross-sectional view taken along lines A-A, B-B, and C-C of FIG. 7, and FIG. 11 is a cross-sectional view taken along line A-A of FIG. 7 of a door hinge apparatus of a vehicle according to various exemplary embodiments of the present invention, before operation.

A door hinge apparatus of a vehicle according to various exemplary embodiments of the present invention may be applied to a rear door of a vehicle (e.g., a passenger vehicle) without a B-pillar. That is, the opening and closing operation of the rear door alone is enabled, by displacing the rear door rearward for the opening and closing operation to secure a rotation trajectory of the rear door to avoid interference with a front door.

Referring to FIG. 5 to FIG. 11, a door hinge apparatus 1 of a vehicle according to various exemplary embodiments of the present invention includes a slide unit 5 including a slide body 10 and a main slider 20, a 2-stage hinge slider 30, a door hinge bracket 40, and a driving unit 50.

First, the slide body 10 is provided on one side of a vehicle body 3 corresponding to an end portion of rear door, and the main slider 20 of the slide unit 5 is movable in a width direction of the vehicle with respect to the slide body 10.

In detail, the slide body 10 includes a rear plate 15, an upper plate 11, and a lower plate 13. The upper plate 11 and the lower plate 13 are integrally formed on an upper end portion and a lower end portion of the rear plate 15, respectively. The slide body 10 is provided on one side of the vehicle body 3 corresponding to a rear end portion of the rear door DR.

Internal surfaces of the upper plate 11 and the lower plate 13 facing each other are respectively formed as a rail surface RF which is slanted. Furthermore, first and second gear slots GS1 and GS2 are formed in a lower portion of the rear plate 15.

The rail surface RF of the slide body 10 is disposed from a vehicle front internal side of the vehicle body 3 toward a vehicle rear external side, and the slide body 10 is provided on one side of a side external panel PL corresponding to the rear end portion of the rear door DR, through the rear plate 15.

Furthermore, in the slide body 10, the first gear slot GS1 on the rear plate 15 is formed below the second gear slot GS2.

The main slider 20 is provided to be slidably movable in the width direction of the vehicle along the rail surface RF of the slide body 10.

In detail, the main slider 20 includes a center rail 21, an upper rail 23, and a lower rail 25 that are formed on a rear surface 29.

First, the center rail 21 is centrally formed on the rear surface 29 of the main slider 20 to protrude toward the vehicle front side.

The upper rail 23 is formed above the center rail 21 of the main slider 20 on the rear surface 29 to protrude toward the vehicle front side, and includes an upper surface which is formed as a slide surface SF contacting the rail surface RF of the upper plate 11 of the slide body 10.

Furthermore, the lower rail 25 is formed below the center rail 21 of the main slider 20 on formed on the rear surface 29 to protrude toward the vehicle front side, and includes a lower surface which is formed as a slide surface SF contacting with the rail surface RF of the lower plate 13 of the slide body 10.

Here, the upper rail 23 forms an upper slide groove SG1 between upper rail 23 and the center rail 21, and the lower rail 25 forms a lower slide groove SG2 between the lower rail 25 and the center rail 21.

Furthermore, a rack portion 27 and a gear hole GH are formed in a lower portion of the rear surface 29 of the main slider 20 corresponding to the first and second gear slots GS1 and GS2 of the slide body 10.

In detail, the rack portion 27 is formed in the lower portion of the rear surface 29 of the main slider 20 corresponding to the first gear slot GS1, and the gear hole GH is formed in a preset range in the rear surface 29 of the main slider 20 corresponding to the second gear slot GS2.

Furthermore, the 2-stage hinge slider 30 includes an upper hinge slider 31, an upper bridge 35, a lower hinge slider 33, and a lower bridge 37.

The upper hinge slider 31 is movably disposed in the upper slide groove SG1 of the main slider 20, and the lower hinge slider 33 is movably disposed in the lower slide groove SG2 of the main slider 20.

A first end portion of the upper bridge 35 is provided within the upper slide groove SG1 to be rotatable around an upper bridge shaft 51, and a frontal end portion of the upper bridge 35 is connected to the upper hinge slider 31 through an upper rotation guide bar 53.

Furthermore, a first end portion of the lower bridge 37 is provided within the lower slide groove SG2 to be rotatable around a lower bridge shaft 55, and a frontal end portion of the lower bridge 37 is connected to the lower hinge slider 33 through a lower rotation guide bar 57.

In various exemplary embodiments of the present invention, it is illustrated that the upper bridge 35 is formed toward the vehicle external side compared to the lower bridge 37, however, the exemplary embodiment is not limited thereto. It may be understood that locations of the upper and lower bridges 35 may be altered.

The upper hinge slider 31 and the lower hinge slider 33 of the 2-stage hinge slider 30 are provided in the upper slide groove and the lower slide groove SG1 and SG2 of the main slider 20 through the upper bridge 35 and the lower bridge 37 rotating around the bridge shafts 51 and 55.

That is, the upper hinge slider 31 and the lower hinge slider 33 is movable in the width direction of the vehicle and also toward the vehicle rear side simultaneously, according to rotation radii of the upper bridge 35 and the lower bridge 37.

Here, in the main slider 20, an upper guide groove GG1 for guiding the rotation of the upper bridge 35 is formed on a lower surface of the upper rail 23 and an upper surface of the center rail 21, respectively, according to a radius of the upper bridge 35. Furthermore, a lower guide groove GG2 for guiding the rotation of the lower bridge 37 is formed on an upper surface of the lower rail 25 and a lower surface of the center rail 21, respectively, according to a radius of the lower bridge 37.

That is, the upper rotation guide bar 53 moves in the upper slide groove SG1 while having its end portions inserted in the upper guide groove GG1, and the lower rotation guide bar 57 moves in the lower slide groove SG2 while having its end portions inserted in the lower guide groove GG2.

The door hinge bracket 40 is engaged with an end portion of a door, and operably connected to the main slider 20 of a slider unit 5.

In more detail, the door hinge bracket 40 is connected to the vehicle external side end portion of the 2-stage hinge slider 30 through a hinge shaft 41.

That is, the door hinge bracket 40 is fixed to the rear end portion of the rear door DR, and coupled with the vehicle external side end portions of the upper hinge slider 31 and the lower hinge slider 33 through the hinge shaft 41.

When the rear door DR is opened and closed, the door hinge bracket 40 allows rotation while supporting the rear door DR with respect to the 2-stage hinge slider 30.

Furthermore, the driving unit 50 includes a motor M, first and second motor gears MG1 and MG2, a bridge drive gear BG1, and a bridge gear BG2.

First, the motor M is provided on the rear plate 15 of the slide body 10. That is, the motor M is provided upwardly on a motor bracket 17 integrally formed on a lower portion of the rear plate 15, to provide torque.

At the present time, the motor M may be a step motor configured for controlling rotation speed and rotating direction.

The first motor gear MG1 is provided on a motor shaft MS of the motor. At the instant time, the first motor gear MG1 is always engaged with the rack portion 27 of the main slider 20 through the first gear slot GS1.

The second motor gear MG2 is provided on the motor shaft MS of the motor M. At the instant time, the second motor gear MG2 is disposed corresponding to the second gear slot GS2.

The bridge drive gear BG1 is mounted on a gear bracket 19 formed on the rear plate 15 of the slide body 10 to be rotatably around a gear shaft 43. At the instant time, the bridge drive gear BG1 is always engaged with the second motor gear MG2.

The bridge gear BG2 is provided on the lower bridge shaft 55 to be coupled with the lower bridge 37. At the instant time, the bridge gear BG2 is provided to be engaged with the bridge drive gear BG1 in the preset range through the gear hole GH and the second gear slot GS2.

Here, the bridge gear BG2 may be partially cut from a fully circular gear shape, to be fitted with the lower bridge 37.

Meanwhile, the second gear slot GS2 formed on the slide body 10 is formed across the rear plate 15 in the width direction of the vehicle such that the bridge gear BG2 may be engaged with the bridge drive gear BG1 after moving to the bridge drive gear BG1.

Furthermore, the second motor gear MG2 and the bridge drive gear BG1 may have a gear ratio to transfer the driving torque of the motor M to the bridge gear BG2 by deceleration.

That is, to transfer the driving torque of the motor M by deceleration, i.e., to achieve an increase torque, the second motor gear MG2 is formed with a smaller diameter than the bridge drive gear BG1.

By the driving unit 50, while a plurality of gears of the first and the second motor gears MG1 and MG2 configured corresponding to the first and second gear slots GS1 and GS2, the bridge drive gear BG1, and the bridge gear BG2 are operated by the operation of the motor M, after the main slider 20 is moved in the width direction of the vehicle along the rail surface RF of the slide body 10, the 2-stage hinge slider 30 in the upper slide groove and the lower slide groove SG1 and SG2 of the main slider 20 is moved, in the preset range, in the width direction of the vehicle and also toward the vehicle rear side, according to the preset radius.

Accordingly, for the opening and closing operation of the rear door DR, the rear door DR is pushed toward the vehicle rear external side of the vehicle body 3, to secure the rotation trajectory of the rear door DR.

Hereinafter, an operation of a door hinge apparatus of a vehicle according to an exemplary embodiment of the present invention is described in detail with reference to FIG. 11, FIG. 12, and FIG. 13.

Figure 12:
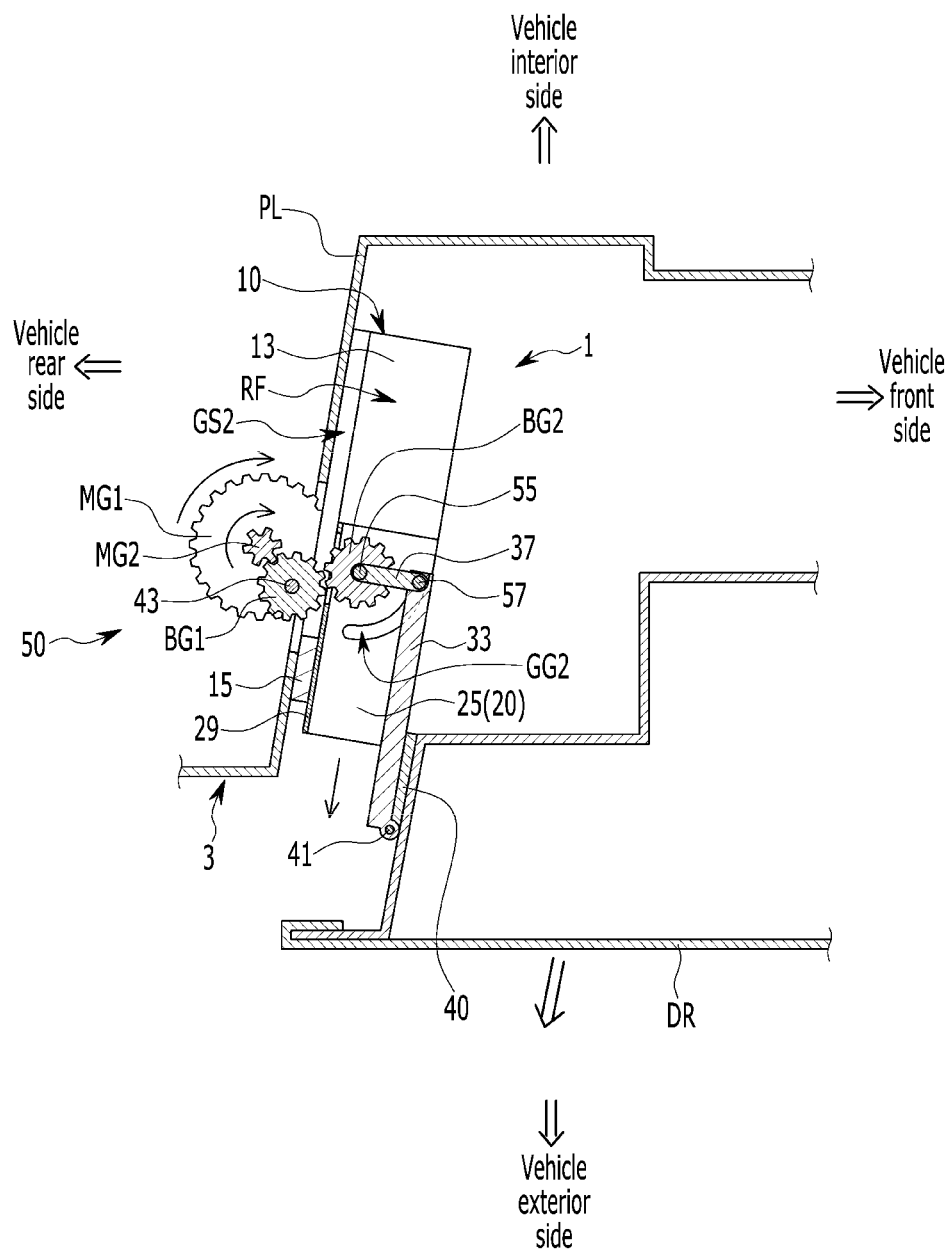
FIG. 12 is a cross-sectional view taken along line B-B of FIG. 7 in an operation state of the main slider in a door hinge apparatus of a vehicle according to an exemplary embodiment of the present invention.
Figure 13:
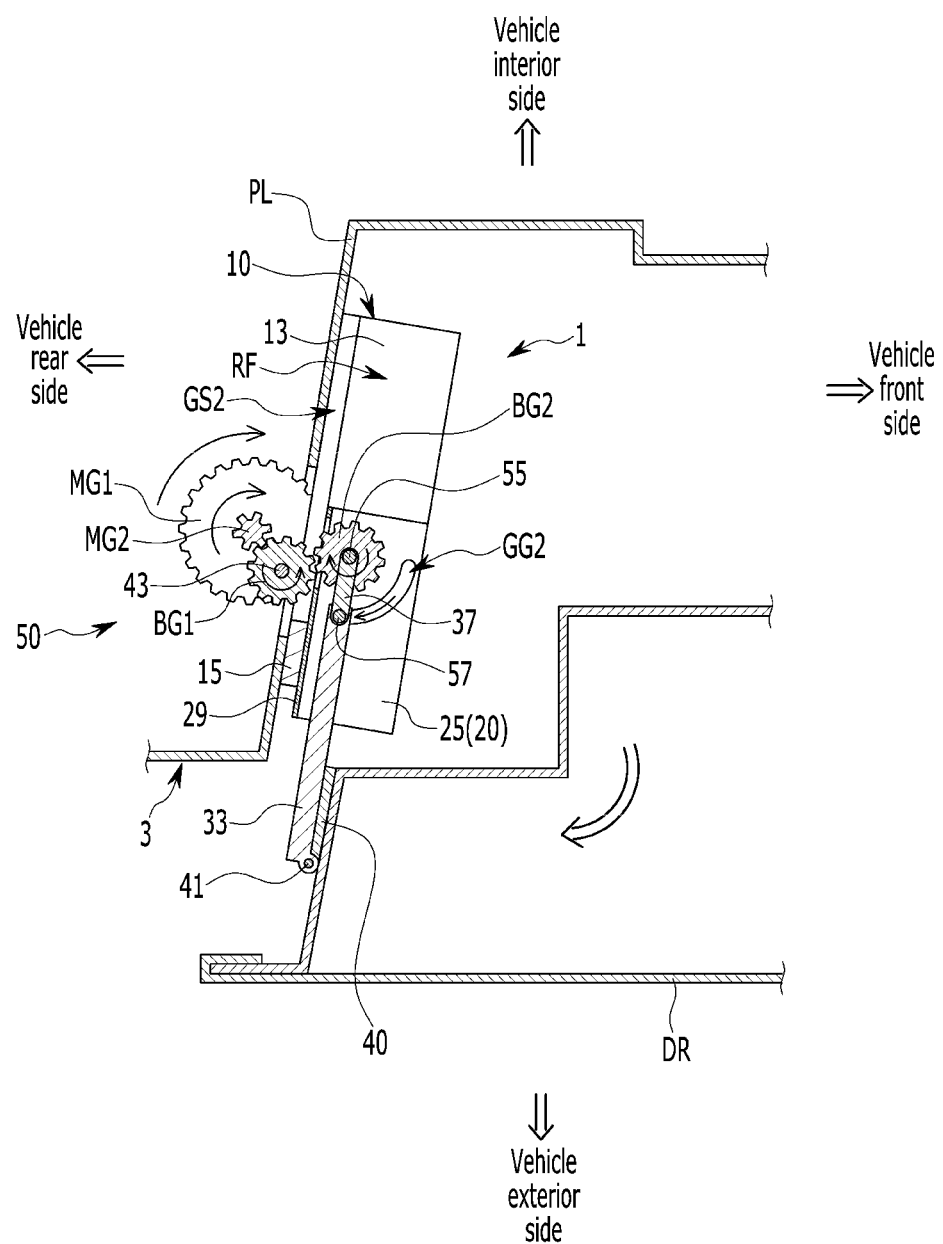
FIG. 13 is a cross-sectional view taken along line B-B of FIG. 7 in an operation state of the 2-stage hinge slider in a door hinge apparatus of a vehicle according to an exemplary embodiment of the present invention.
Figure 14:
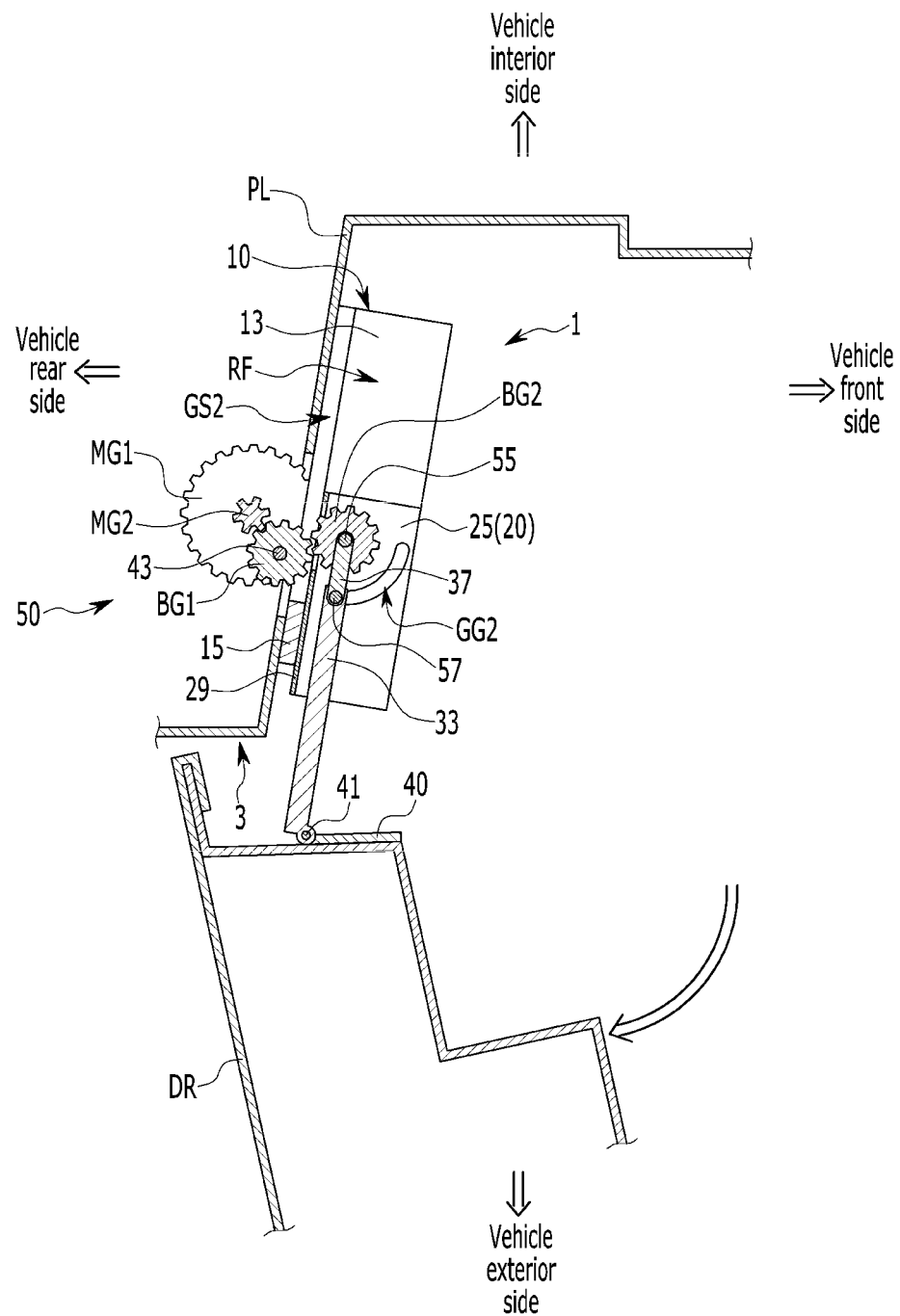
FIG. 14 is a cross-sectional view taken along line B-B of FIG. 7 in a door opened state in a door hinge apparatus of a vehicle according to an exemplary embodiment of the present invention.

FIG. 12 is a cross-sectional view taken along line B-B of FIG. 7 in an operation state of the main slider in a door hinge apparatus of a vehicle according to various exemplary embodiments of the present invention, FIG. 13 is a cross-sectional view taken along line B-B of FIG. 7 in an operation state of the 2-stage hinge slider in a door hinge apparatus of a vehicle according to various exemplary embodiments of the present invention, and FIG. 14 is a cross-sectional view taken along line B-B of FIG. 7 in a door opened state in a door hinge apparatus of a vehicle according to an exemplary embodiment of the present invention.

First, referring to FIG. 11, the rear door DR is in closed state.

At the present time, the main slider 20 together with the 2-stage hinge slider 30, the door hinge bracket 40, and the rear end portion of the rear door DR is in a state having moved toward the vehicle front internal side of the vehicle body 3 along the rail surface RF on the slide body 10, and the rear door DR remains at the closed state.

Referring to FIG. 12, to independently open the rear door DR, the motor M is first operated clockwise.

Accordingly, the first motor gear MG1 rotates clockwise while being engaged with the rack portion 27 of the main slider 20, and thereby the main slider 20 is moved toward the vehicle rear external side of the vehicle body 3 along the rail surface RF of a slider body 10.

At the present time, the rear door DR also moves together the main slider 20 toward the vehicle rear external side of the vehicle body 3, and the bridge gear BG2 moves together with the main slider 20 until being engaged with the bridge drive gear BG1.

In the present state, the rear end portion of the rear door DR is in the state having moved together with the main slider 20 toward the vehicle rear external side of the vehicle body 3, and thus the rotation trajectory to independently open the rear door DR is secured.

That is, when an occupant opens the rear door DR, the rear door DR is opened by rotating, together with the door hinge bracket 40, with respect to the 2-stage hinge slider 30 around hinge shaft 25.

In addition to the above, in various exemplary embodiments of the present invention, the rotation trajectory of the rear door with respect to the front door is further secured as follows.

Referring to FIG. 13, after the bridge gear BG2 has moved until being engaged with the bridge drive gear BG1, the motor M is further driven clockwise. In the instant case, the bridge drive gear BG1 is driven anticlockwise by the clockwise rotation of the second motor gear MG2.

Accordingly, the bridge gear BG2 engaged with the bridge drive gear BG1 is rotated clockwise to rotate the lower bridge 37 clockwise around the lower bridge shaft 55.

Accordingly, the lower hinge slider 33 the lower slide groove SG2 of the main slider 20 moves in the width direction of the vehicle and also toward the vehicle rear side, collapsing the gap between lower hinge slider 33 and the rear plate 15 of the slide body 10.

Meanwhile, the upper hinge slider 31 in the upper slide groove SG1 of the main slider 20 moves together with the lower hinge slider 33, and therefore moves in the width direction of the vehicle and also toward the vehicle rear side of the vehicle body 3 simultaneously, according to the radius of the upper bridge 35.

In various exemplary embodiments of the present invention, the radius of the upper bridge 35 may be equal to the radius of the lower bridge 33.

At the present time, in the 2-stage hinge slider 30, the vehicle external side end portions of the upper and lower hinge sliders 31 and 33 are connected to the door hinge bracket 40 through the hinge shaft 41, and the upper and lower hinge sliders 31 and 33 are connected to the upper and lower bridges 35 and 37 at different connection positions in the upper slide groove and the lower slide groove SG1 and SG2. Therefore, the upper and lower hinge sliders 31 and 33 may stably move, avoiding undesired motion such as twisting, according to the rotation of the upper and lower bridges 35 and 37.

Accordingly, the rear end portion of the rear door DR may further move toward the vehicle rear external side of the vehicle body 3, further securing the rotation trajectory of the rear door DR.

Referring to FIG. 14, thereafter, when an occupant opens the rear door, the rear door DR rotates together with the door hinge bracket 40 with respect to the 2-stage hinge slider 30 around hinge shaft 41, and is opened without interference with the front door.

Meanwhile, the closing operation of the rear door DR is performed in an opposite manner to the opening operation such that the opening and closing operation of the rear door DR may be performed independently from the front door, and the operation is not described in further detail.

Therefore, a door hinge apparatus 1 of a vehicle according to various exemplary embodiments of the present invention may be applied to the vehicle body 3 and the rear end portion of the rear door DR among opposite swing doors of a vehicle without a B-pillar, facilitating the opening and closing operation of the rear door DR independently from the front door.

According to various exemplary embodiments of the present invention, by the operation of the motor M, the main slider 20 first slides along the rail surface RF on the slide body 10 from the vehicle front internal side of the vehicle body 3 toward the vehicle rear external side. Thereafter, the upper and lower hinge sliders 31 and 33 in the 2-stage hinge slider 30 is further moved in the width direction of the vehicle and also toward the vehicle rear side simultaneously, by upper and lower bridges 35 and 37.

Accordingly, in a process of opening of the rear door DR, the rear end portion of the rear door DR is pushed toward the vehicle rear external side of the vehicle body 3 in advance, to secure the rotation trajectory of the rear door DR without interference with other component portions, and in the instant state, the opening and closing operation of the rear door DR alone is enabled.

Accordingly, according to a door hinge apparatus 1 of a vehicle according to various exemplary embodiments of the present invention, in opposite swing doors of a vehicle without a B-pillar, while maintaining the merit of good open feeling when the passengers get on/off or in leisure activities, the rotation trajectory of the rear door DR may be secured when the rear door DR is opened and closed, and thereby the door opening and closing sequence is not limited.

Furthermore, a door hinge apparatus 1 of a vehicle according to an exemplary embodiment of the present invention is slimmer than a conventional gooseneck-type hinge device, and also has an advantage in vehicle body layout configuration because it does not require an extra free space for the rear door operation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door hinge apparatus of a vehicle, the door hinge apparatus comprising:
    a slide unit including a slide body and a main slider, wherein the slide body is provided on one side of a vehicle body corresponding to an end portion of a door in the vehicle and the main slider is movable in a width direction of the vehicle with respect to the slide body;
    a door hinge bracket engaged with the end portion of the door and operably coupled to the main slider; and
    a 2-stage hinge slider configured to be movable in the width direction of the vehicle and also toward a vehicle rear side simultaneously according to a preset radius by corresponding bridges rotatable in an upper slide groove and a lower slide groove formed in the main slider,
    wherein the door hinge bracket is pivotally connected to the 2-stage hinge slider through a hinge shaft.

2. The door hinge apparatus of claim 1, further including:
    a driving unit configured to provide a driving torque to the main slider and the bridges so that, after the main slider moves in the width direction of the vehicle with respect to the slide body, the 2-stage hinge slider in a preset range moves with respect to the main slider in the width direction of the vehicle and also toward the vehicle rear side according to the preset radius.

3. The door hinge apparatus of claim 2,
    wherein the slide body includes a rear plate, an upper plate, and a lower plate, wherein internal surfaces of the upper plate and the lower plate facing each other are formed as rail surfaces that are slanted, and a first gear slot and a second gear slot are formed in a lower portion of the rear plate, and
    wherein the main slider includes a center rail, an upper rail, and a lower rail that are formed on a rear surface of the main slider to protrude toward a vehicle front side, is provided movable in the width direction of the vehicle along the rail surfaces of the slide body, includes the upper slide groove between the center rail and the upper rail and the lower slide groove between the center rail and the lower rail, and includes a rack portion and a gear hole in a lower portion of the rear surface corresponding to the first and second gear slots.

4. The door hinge apparatus of claim 3, wherein the end portion of the door is a rear end portion of a rear door in the vehicle.

5. The door hinge apparatus of claim 4, wherein the slide body is provided on a side external panel corresponding to the rear end portion of the rear door so that the rail surfaces are disposed from a vehicle front internal side of the vehicle body toward a vehicle rear external side thereof.

6. The door hinge apparatus of claim 3, wherein the first gear slot is formed below the second gear slot.

7. The door hinge apparatus of claim 3,
    wherein the center rail is formed on the rear surface to protrude toward the vehicle front side,
    wherein the upper rail is formed above the center rail on the rear surface to protrude toward the vehicle front side, includes an upper surface formed as a slide surface contacting a rail surface of the upper plate of the slide body among the rail surfaces, and includes the upper slide groove between the upper rail and the center rail, and wherein the lower rail is formed below the center rail on the rear surface to protrude toward the vehicle front side, includes a lower surface formed as a slide surface contacting a rail surface of the lower plate of the slide body among the rail surfaces, and includes the lower slide groove between the lower rail and the center rail.

8. The door hinge apparatus of claim 7, wherein, in the main slider,
   an upper guide groove is formed on a lower surface of the upper rail and an upper surface of the center rail, respectively, according to a radius of an upper bridge; and
   a lower guide groove is formed on an upper surface of the lower rail and a lower surface of the center rail, respectively, according to a radius of a lower bridge.

9. The door hinge apparatus of claim 3, wherein the 2-stage hinge slider includes upper and lower hinge sliders provided in the upper slide groove and the lower slide groove of the main slider through an upper bridge and a lower bridge rotatable around corresponding bridge shafts, respectively so that upper and lower hinge sliders are movable in the width direction of the vehicle and also toward the vehicle rear side simultaneously according to the preset radius.

10. The door hinge apparatus of claim 9, wherein, in the 2-stage hinge slider
    the upper hinge slider is movably disposed in the upper slide groove;
    the upper bridge is provided in the upper slide groove to be rotatable around an upper bridge shaft, and connected to the upper hinge slider through an upper rotation guide bar;
    the lower hinge slider is movably disposed in the lower slide groove; and
    the lower bridge is provided in the lower slide groove to be rotatable around a lower bridge shaft, and connected to the lower hinge slider through a lower rotation guide bar.

11. The door hinge apparatus of claim 9, wherein the upper bridge is formed toward a vehicle external side of the vehicle body compared to the lower bridge.

12. The door hinge apparatus of claim 10,
    wherein the upper rotation guide bar moves in the upper slide groove while having end portions inserted in the upper guide groove; and
    wherein the lower rotation guide bar moves in the lower slide groove while having end portions inserted in the lower guide groove.

13. The door hinge apparatus of claim 9, wherein the door hinge bracket is engaged with the end portion of the door, and is connected to a vehicle external side end portion of the 2-stage hinge slider through the hinge shaft.

14. The door hinge apparatus of claim 9, wherein the driving unit is configured such that, while a plurality of gears are operated by a driving torque, after the main slider is moved in the width direction of the vehicle along a rail surface of the slide body, the 2-stage hinge slider in the upper slide groove and the lower slide groove of the main slider is moved, in the preset range, in the width direction of the vehicle and also toward the vehicle rear side, according to the preset radius.

15. The door hinge apparatus of claim 14, wherein the driving unit includes:
    a motor is mounted on a motor bracket formed on the slide body to provide the driving torque;
    a first motor gear provided on a motor shaft of the motor and continuously engaged with the rack portion of the main slider through the first gear slot;
    a second motor gear provided on the motor shaft of the motor and disposed corresponding to the second gear slot;
    a bridge drive gear mounted on a gear bracket formed on the rear plate of the slide body and continuously engaged with the second motor gear; and
    a bridge gear fitted with the lower bridge and engageable with the bridge drive gear in the preset range through the gear hole and the second gear slot.

16. The door hinge apparatus of claim 15, wherein the second motor gear and the bridge drive gear have a gear ratio to transfer the driving torque of the motor to the bridge gear by deceleration.

17. The door hinge apparatus of claim 15, wherein the second gear slot is formed across the rear plate of the slide body in the width direction of the vehicle so that the bridge gear is engaged with the bridge drive gear after moving to the bridge drive gear.

\* \* \* \* \*